(12) United States Patent
James et al.

(10) Patent No.: US 10,710,737 B2
(45) Date of Patent: Jul. 14, 2020

(54) AIRCRAFT FUEL SYSTEM

(71) Applicant: Airbus Operations Limited, Bristol (GB)

(72) Inventors: Dylan James, Bristol (GB); Justine McCarthy, Bristol (GB); Angus Morgan, Bristol (GB); Michael Poad, Bristol (GB); Nicholas Morton, Bristol (GB); Henry Edwards, Bristol (GB); Richard Burness, Bristol (GB); Christopher Slack, Bristol (GB)

(73) Assignee: Airbus Operations Limited, Bristol (GB)

( * ) Notice: Subject to any disclaimer, the term of this patent is extended or adjusted under 35 U.S.C. 154(b) by 740 days.

(21) Appl. No.: 15/363,509

(22) Filed: Nov. 29, 2016

(65) Prior Publication Data
US 2017/0152056 A1    Jun. 1, 2017

(30) Foreign Application Priority Data

Nov. 30, 2015    (GB) .................................. 1521068.5

(51) Int. Cl.
*B64D 37/28*    (2006.01)
*B64C 3/34*    (2006.01)
(Continued)

(52) U.S. Cl.
CPC ............... *B64D 37/28* (2013.01); *B64C 3/34* (2013.01); *B64D 37/04* (2013.01); *B64D 37/08* (2013.01); *B64D 37/20* (2013.01); *Y02T 50/44* (2013.01)

(58) Field of Classification Search
CPC ...... B64D 37/005; B64D 37/04; B64D 37/08; B64D 37/20; B64D 37/28; B64D 37/34
See application file for complete search history.

(56) References Cited

U.S. PATENT DOCUMENTS 2,409,245 A    10/1946    Black
3,172,420 A *    3/1965    Brown .................. B64D 37/20
                                                              137/219
(Continued)

FOREIGN PATENT DOCUMENTS

GB    802294 A  *  10/1958  ............. B64D 37/20
JP    4-197891          7/1992

OTHER PUBLICATIONS

European Search Report for EP Application No. 16199565.9, five pages (dated Apr. 7, 2017).
(Continued)

*Primary Examiner* — Richard R. Green
(74) *Attorney, Agent, or Firm* — Nixon & Vanderhye P.C.

(57) ABSTRACT

An aircraft fuel tank system including a fuel tank compartment for containing liquid fuel and having a float-activated valve arranged to become positively buoyant when immersed in liquid fuel so that the float moves up to a raised position which causes the valve to close and prevent liquid fuel from flowing out of the fuel tank compartment through the valve. The float is also arranged to move down to a lowered position in response to a level of the liquid fuel in the fuel tank compartment dropping, the movement of the float to the lowered position causing the valve to open and permit liquid fuel to flow out of the fuel tank compartment through the valve. A pressure-activated valve may be used as an alternative to the float-activated valve.

16 Claims, 5 Drawing Sheets

(51) Int. Cl.
*B64D 37/20* (2006.01)
*B64D 37/04* (2006.01)
*B64D 37/08* (2006.01)

(56) References Cited

U.S. PATENT DOCUMENTS

| | | | |
|---|---|---|---|
| 9,254,923 B2 * | 2/2016 | Hashimoto | B64D 37/06 |
| 2005/0139727 A1 | 6/2005 | Wozniak et al. | |
| 2014/0027575 A1 * | 1/2014 | Goto | B64D 37/28 |
| | | | 244/135 C |
| 2015/0034768 A1 | 2/2015 | Hashimoto et al. | |

OTHER PUBLICATIONS

International Search Report cited in GB1521068.5, dated Jan. 20, 2017, five pages.

* cited by examiner

AIRCRAFT FUEL SYSTEM

RELATED APPLICATION

This application claims priority to Great Britain patent application 1521068.5 filed Nov. 30, 2015, the entirety of which is incorporated by reference.

FIELD OF THE INVENTION

The present invention relates to an aircraft fuel system.

BACKGROUND OF THE INVENTION

Conventional aircraft fuel systems suffer from the problem of unusable fuel (also known as residual fuel)—that is, fuel which cannot be fed out of the fuel tank because it is trapped in a low or inaccessible region. The weight of unusable/residual fuel is included in the empty weight of the aircraft. This extra empty weight reduces the aircraft operator's permitted usage of the aircraft in terms of range, passengers and cargo.

SUMMARY OF THE INVENTION

A first aspect of the invention provides an aircraft fuel tank system comprising a fuel tank compartment for containing liquid fuel; and a float-activated valve comprising a float which is arranged to become positively buoyant when immersed in liquid fuel so that the float moves up to a raised position which causes the valve to close and prevent liquid fuel from flowing out of the fuel tank compartment through the valve, and the float is also arranged to move down to a lowered position in response to a level of the liquid fuel in the fuel tank compartment dropping, the movement of the float to the lowered position causing the valve to open and permit liquid fuel to flow out of the fuel tank compartment through the valve.

The float may close the valve by blocking a flow path through the valve when the float moves up. However more typically the float is coupled to a valve member which closes the valve by blocking a flow path through the valve when the float moves up.

The float may move in a straight line between its raised and lowered positions, but more typically the valve further comprises a crank arm which is arranged to rotate on a pivot; the float is carried by the crank arm on a first side of the pivot; a valve member is carried by the crank arm on a second side of the pivot; and the valve member is arranged to rotate on the crank arm and close the valve by blocking a flow path through the valve when the float rotates up on the crank arm to the raised position.

A second aspect of the invention provides an aircraft fuel tank system comprising a fuel tank compartment for containing liquid fuel; and a pressure-activated valve comprising a valve actuator which is arranged so that a weight of liquid fuel in the fuel tank compartment applies a pressure to the valve actuator which causes the valve actuator to move to a first position which in turn causes the valve to close and prevent liquid fuel from flowing out of the fuel tank compartment through the valve, and the valve actuator is also arranged to move to a second position in response to a level of the liquid fuel in the fuel tank compartment dropping and an associated reduction in the pressure applied to the valve actuator, the movement of the valve actuator to the second position causing the valve to open and permit liquid fuel to flow out of the fuel tank compartment through the valve.

Like the float-activated valve of the first aspect of the invention, the pressure-activated valve automatically opens in response to a drop in the level of the liquid fuel.

Typically a spring biases the valve actuator towards its second position.

In one embodiment the weight of liquid fuel in the fuel tank compartment applies the pressure to a first side of the valve actuator, and a mass of trapped gas applies an opposing gas pressure to a second side of the valve actuator.

Optionally the fuel tank compartment is a first fuel tank compartment, and the valve permits liquid fuel to flow out of the first fuel tank compartment through the valve into a second fuel tank compartment. A pump may be provided for pumping liquid fuel out of the first and/or second fuel tank compartment. Optionally a first pump is provided for pumping liquid fuel out of the first fuel tank compartment and a second pump is provided for pumping liquid fuel out of the second fuel tank compartment.

The first and second fuel tank compartments may be permanently sealed from each other (except when the valve is open). Alternatively they may be connected by a transfer pipe which permits liquid fuel to flow between the first and second fuel tank compartments; and the valve is positioned so that when the level of the liquid fuel drops below the transfer pipe it can still flow through the valve into the second fuel tank compartment. Optionally an isolation valve is provided which can be closed to prevent liquid fuel from flowing between the first and second fuel tank compartments through the transfer pipe. Where a transfer pipe is provided, then typically a pump is provided in the second compartment for pumping liquid fuel out of the second fuel tank compartment, and fuel in the first fuel tank compartment flows through the transfer pipe before being pumped out of the second fuel tank compartment.

The valve is typically provided towards a bottom of the fuel tank compartment so that liquid fuel is gravity-fed through the valve. Typically the fuel tank compartment comprises a bottom wall, a rib which is joined to the bottom wall, and a seal member which seals a gap between the rib and the bottom wall; wherein the valve is carried by the seal member and permits liquid fuel to flow out of the first fuel tank compartment through the valve and through the gap into the second fuel tank compartment. Optionally the valve comprises a pipe which is carried by the seal member.

The aircraft fuel tank system may be installed in a wing of the aircraft, or in any other part of the aircraft such as the fuselage (centre tank).

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
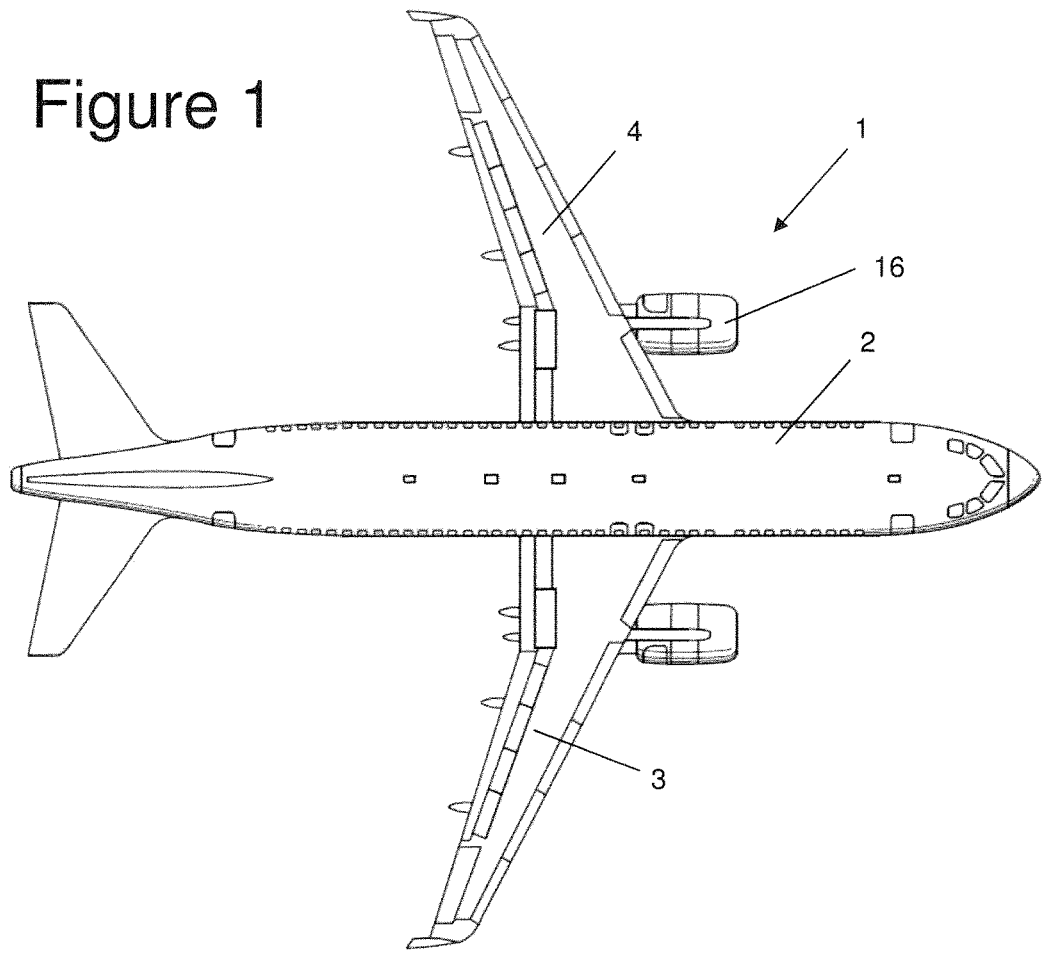
FIG. 1 is a plan view of an aircraft.
Figure 2:
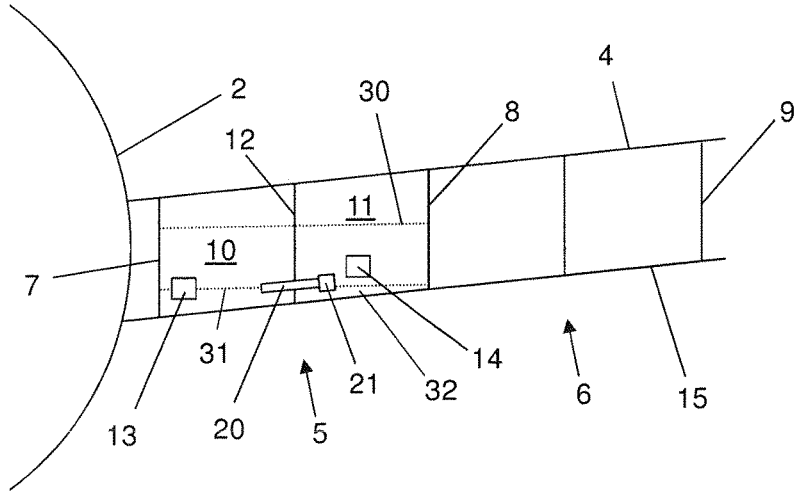
FIG. 2 is a schematic view of part of a port wing of the aircraft.

An aircraft 1 shown in FIG. 1 comprises a fuselage 2 and a pair of wings 3, 4. FIG. 2 is a schematic cross-sectional view of the port wing 4 viewed from the front. The wing 4 has an inboard wing tank 5 and an outboard wing tank 6. The inboard wing tank 5 is bounded by a sealed rib 7 at its inboard end and a sealed rib 8 at its outboard end. Similarly the outboard wing tank 6 is bounded by the sealed rib 8 at its inboard end and a sealed rib 9 at its outboard end.

The inboard wing tank is divided into two compartments 10, 11 divided by a rib 12. The compartments 10, 11 are connected by a transfer pipe 20 which permits liquid fuel to flow between them in either direction. Thus during normal operation the height of fuel in the two compartments 10, 11 is the same until it drops below the transfer pipe 20. The dihedral angle of the wing means that the bottom skin 15 of the wing (which provides the bottom wall of both wing tanks 5, 6) is angled down towards its inboard end. Fuel pumps 13, 14 are arranged to pump fuel out of the compartments 10, 11 to a port engine 16. The fuel pump 13 in the inboard compartment 10 is used during normal operation to pump fuel from both compartment 10, 11 and the pump 14 in the outboard compartment 11 is only used in an emergency. Thus during normal operation all fuel that leaves the outboard compartment 11 flows into the inboard compartment 10.

An isolation valve 21 at the outboard end of the transfer pipe 20 is normally open, but can be closed in an emergency to prevent liquid fuel from flowing through the pipe 20 in either direction. Such an emergency situation may be a rotor burst in the engine 16 which pierces one compartment 10, 11 but not the other—in such a situation the pilot will close the isolation valve 21 to conserve fuel in the compartment which has not been pierced. If the inboard compartment 10 is pierced then the emergency pump 14 is operated to pump fuel from the outboard compartment 11.

When the level of the liquid fuel is fairly high (as indicated by line 30) then fuel can flow through the transfer pipe 20. However when the level drops below the bottom of the transfer pipe 20, as indicated at 31, then fuel can no longer flow through it so a pool 32 of unusable fuel remains in the outboard compartment 11, trapped by the rib 12. The transfer pipe 20 cannot be located any lower due to the size of the isolation valve 21 as well as difficulties of allowable driveshaft angles.

Figure 3:
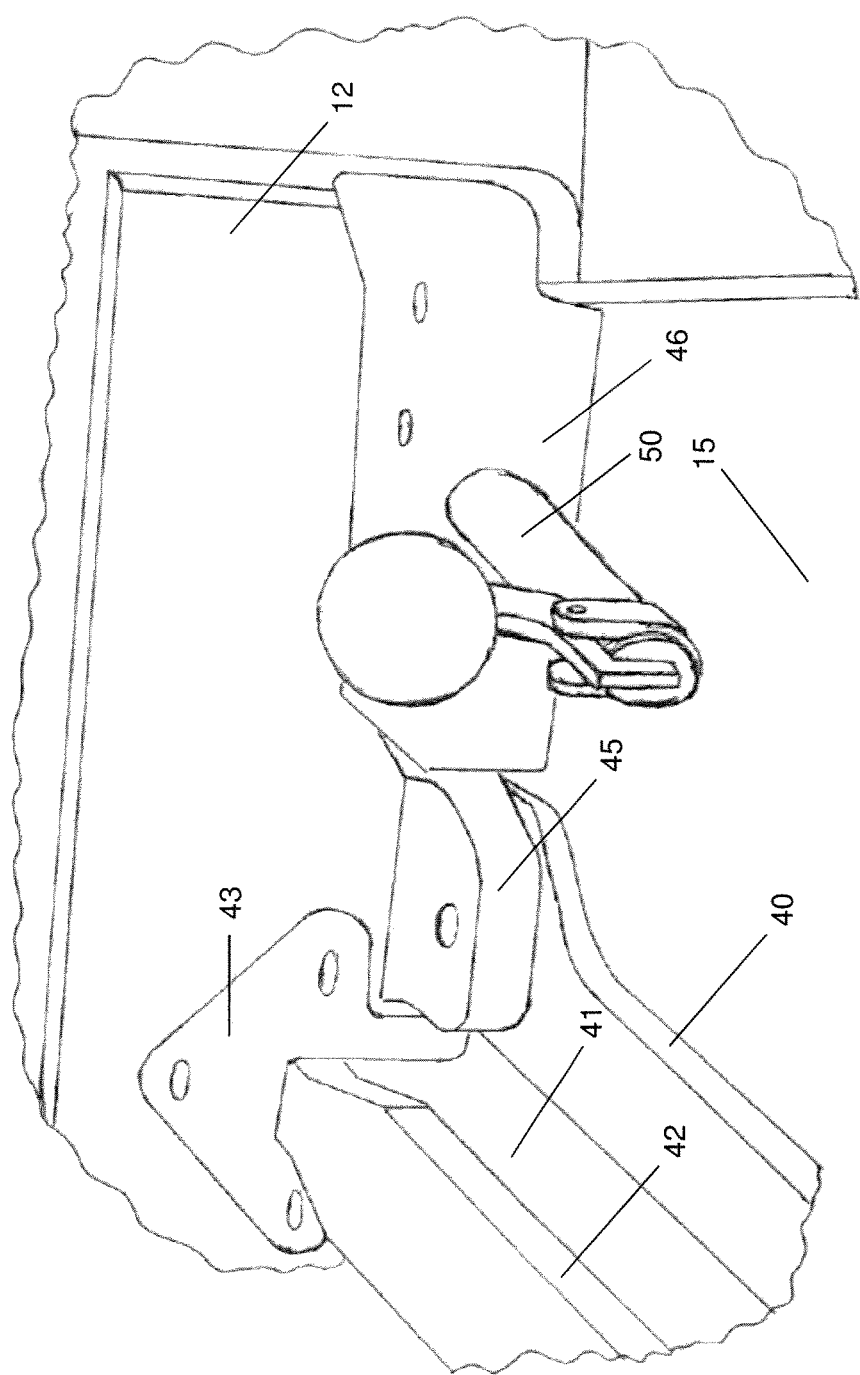
FIG. 3 shows a float-activated valve.
Figure 4:
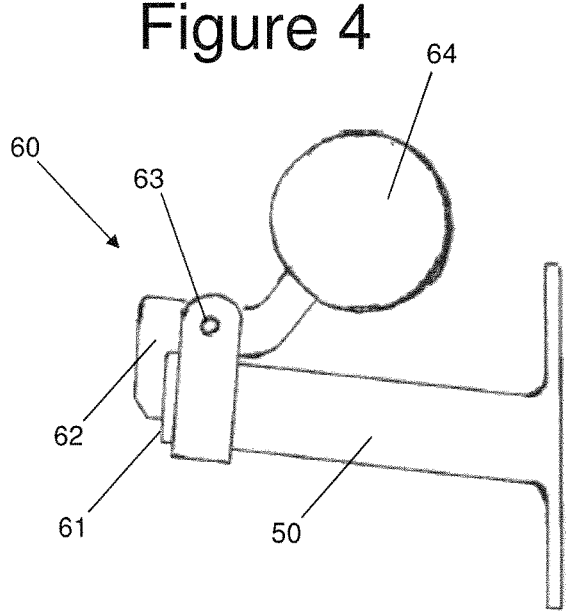
FIG. 4 shows the float-activated valve from the side in its closed state.
Figure 5:
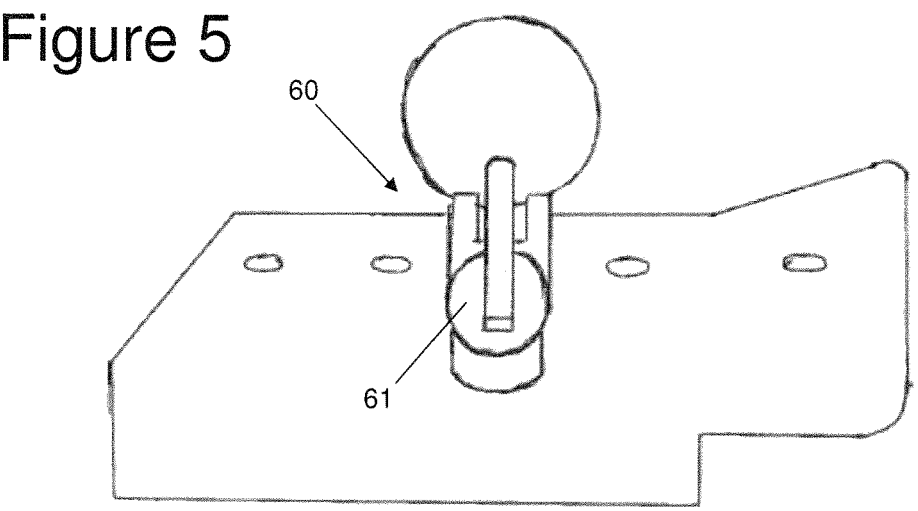
FIG. 5 shows the float-activated valve from the front in its closed state.

FIG. 3 is a view of the outboard face of the rib 12 where it joins the bottom skin 15. The bottom skin 15 carries a plurality of stringers which run spanwise along the wing. One of such stringers is shown in FIG. 3, and it has an I-section with a lower flange 40 attached to the skin 15, a blade 41 extending away from the skin 15, and an upper flange 42. The stringer passes through a cut-out in the bottom edge of the rib 12 as it runs from the outboard compartment 11 (shown in FIG. 3) into the inboard compartment 10 (on the other side of the rib 12 so not visible in FIG. 3). The rib 12 is attached to the bottom skin by a series of rib feet, one of the rib feet 45 being shown in FIG. 3. In this case the rib foot 45 is attached to the lower flange 40 of the stringer.

The gap between the stringer 40-42 and the rib 12 is sealed by a seal plate 43 which is fastened to the rib 12 by fasteners, thus preventing fuel from flowing across the rib 12 through this gap. Similarly a gap 54 (shown in FIG. 6) between the bottom edge 53 of the rib 12 and the skin 15 is sealed by a seal plate 46 which is fastened to the rib 12 by fasteners, thus preventing fuel from flowing across the rib 12 through this gap. The edges of the seal plate are 46 made fluid-tight by a bead of sealant 47 which runs around the full periphery of the seal plate 46. The rib 12 is sealed around its full periphery by seal members similar to the seal plates 43, 46 so fuel is prevented from flowing across the edge 53 of the rib 22 from one compartment 10, 11 into the other, except via a float-activated valve which will now be described.

Figure 7:
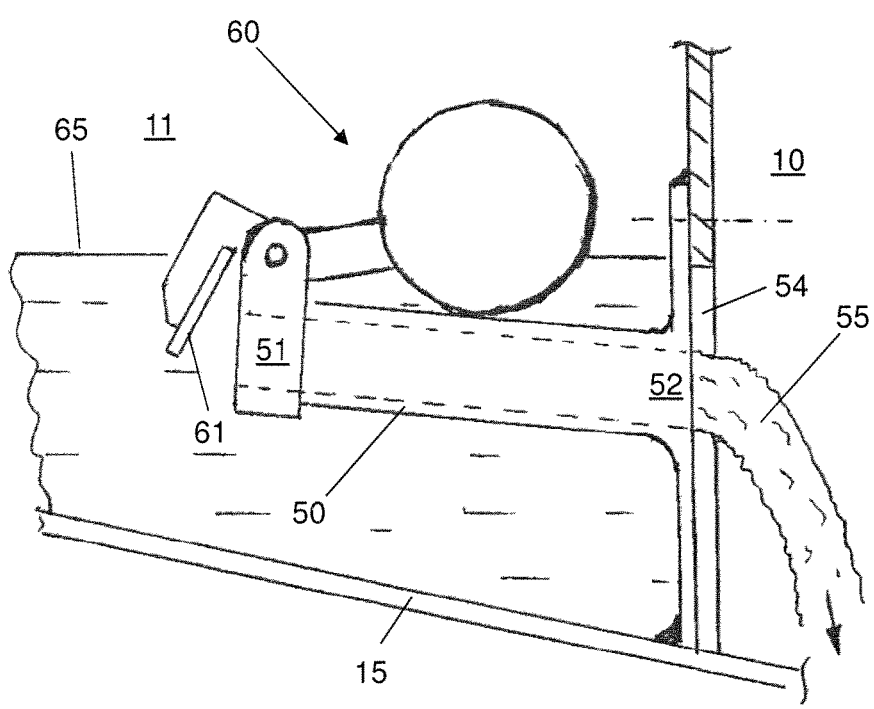
FIG. 7 shows the float-activated valve in its open state.

The seal plate 46 carries a float-activated valve 60 including a valve pipe 50. FIG. 7 is a side view of the valve pipe 50 and rib 12 showing the internal structure of the valve pipe 50 in dashed lines. The valve pipe 50 provides a flow path through the valve 60 with an inlet 51 at one end and an outlet 52 at the other end. The valve pipe 50 is angled down so that liquid is gravity-fed from the inlet 51 to the outlet 52. This prevents water or ice from accumulating inside the valve pipe 50.

Figure 6:
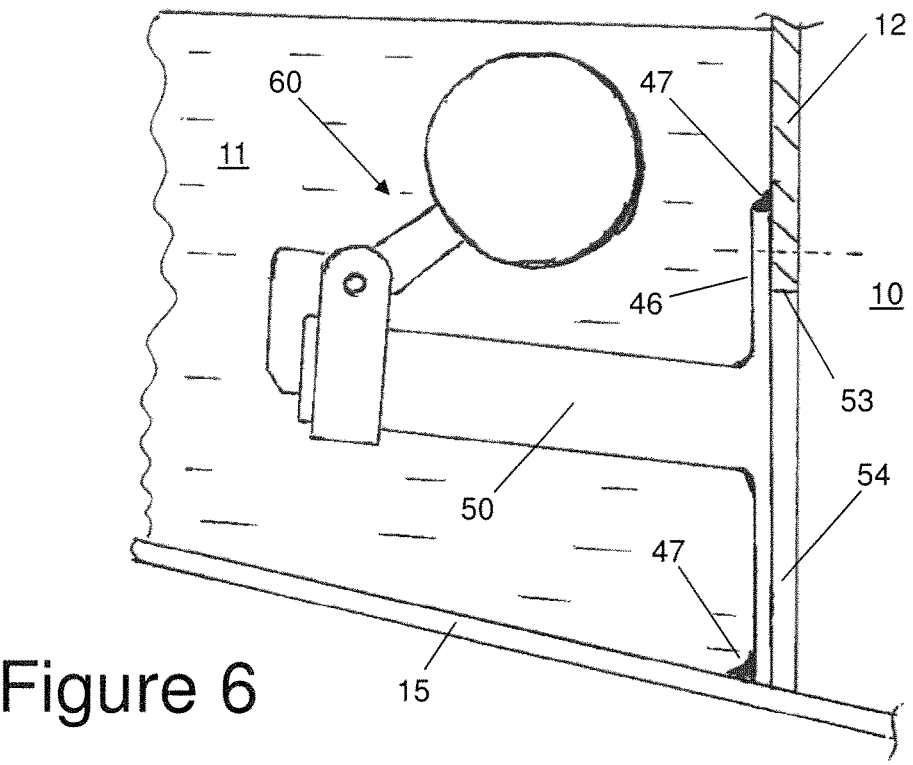
FIG. 6 shows the float-activated valve immersed in fuel.

The valve 60 also comprises a disc 61, a crank arm 62 which is arranged to rotate on a pivot 63, and a float 64. The float 64 is carried by the crank arm on a first side of the pivot 63, and the disc 61 is carried by the crank arm on a second side of the pivot. As shown in FIGS. 6 and 7, the float 64 is located within the outboard fuel compartment 11, along with the rest of the valve 60.

The float 64 becomes positively buoyant when immersed in liquid fuel so that it rotates about the pivot 63 to a raised position shown in FIG. 6 which causes the disc 61 to block the valve pipe 50 and prevent liquid fuel from flowing out of the outboard compartment 11 through the valve 60. The float 64 is also arranged to rotate down about the pivot 63 to a lowered position as shown in FIG. 7 in response to a level 65 of the liquid fuel dropping and the buoyancy forces on the float decreasing. The movement of the float to the lowered position causes the disc 61 to rotate up on the crank arm to an open position shown in FIG. 7 in which it permits liquid fuel 55 to flow through the valve out of the outboard compartment 11 and into the inboard compartment 10 through the pipe outlet 52 and the gap 54 between the rib 12 and the bottom skin 15.

The valve is positioned at a lower level than the transfer pipe 20, so that when the level of the liquid fuel drops below the transfer pipe 20 it can still flow through the valve pipe 50 into the inboard fuel tank compartment 10 as shown in FIG. 7. This reduces the volume of the pool 32 of unusable fuel in the outboard compartment 11 which is trapped by the rib 12. When the fuel tank compartment 11 is re-filled then the disc 61 rotates back down on the crank arm and closes the valve 60 by blocking the flow path 50-52 through the valve as the float 64 rotates up on the crank arm to the raised position.

The valve 60 enables fuel which generally remains in the outboard compartment 11 to be transferred to the inboard compartment 10 at the end of flight without increasing the amount of fuel which is at risk in the event of a tank getting punctured. To achieve this, the valve 60 is arranged so that it does not open unless the fuel level in the outboard compartment 11 is below the transfer pipe 20.

Figure 8:
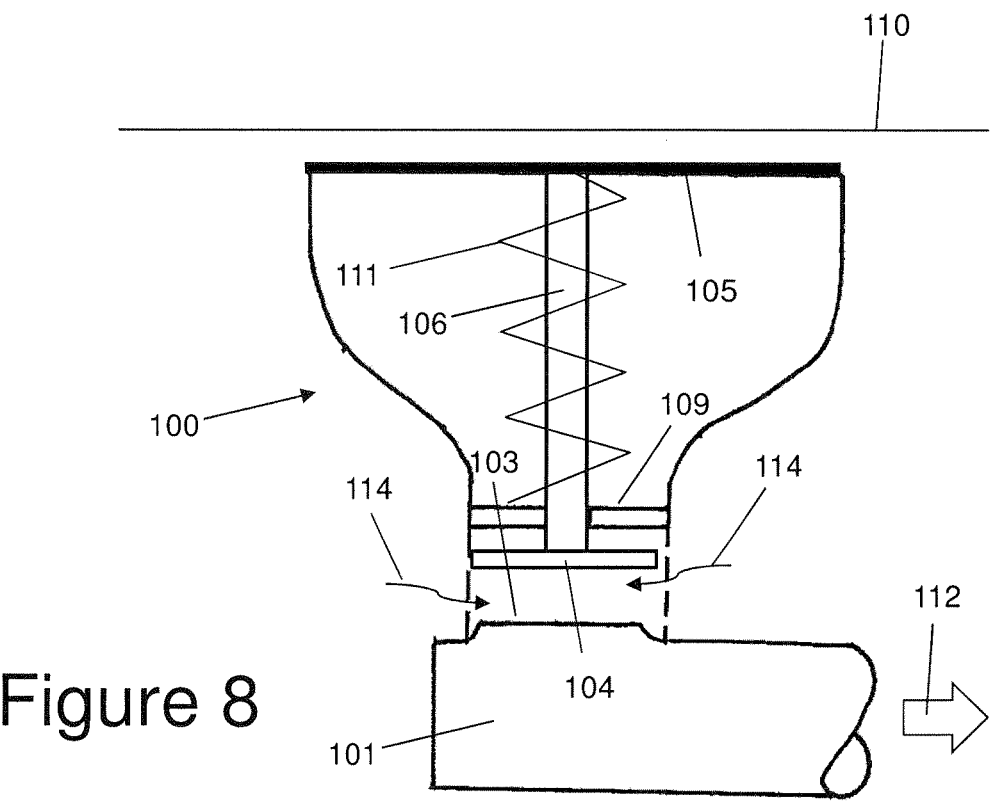
FIG. 8 shows a pressure-activated valve in its open state.
Figure 9:
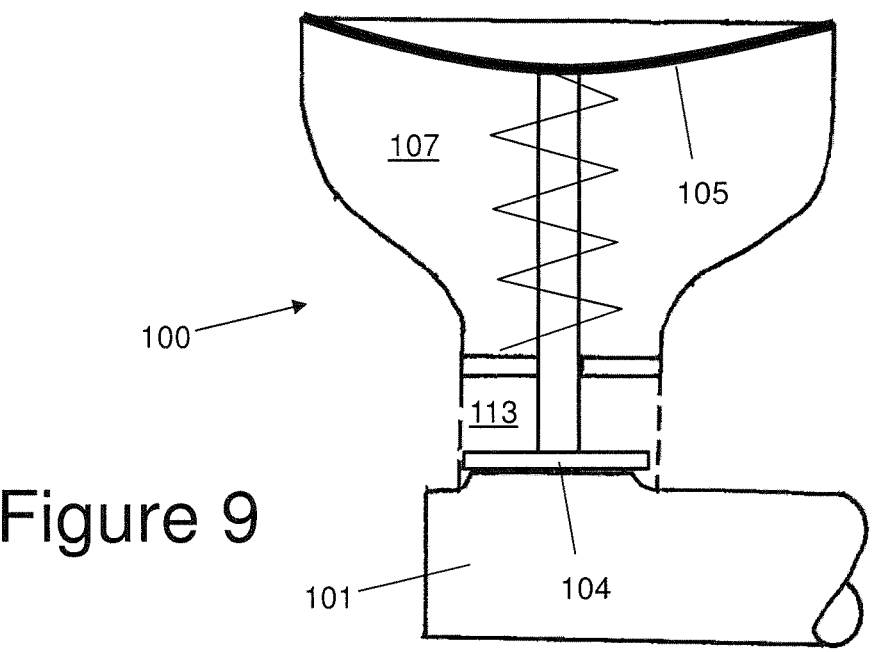
FIG. 9 shows the pressure-activated valve in its closed state.

FIGS. 8 and 9 illustrate a pressure-activated valve 100 which can be carried by the seal plate 46 instead of the float-activated valve 60 described above. Like the float-activated valve 60, the pressure-activated valve 100 automatically opens in response to a drop in the level of the liquid fuel.

As with the valve 60, the valve 100 is carried by a valve pipe 101 with an outlet 102 which leads into the neighbouring fuel compartment. The valve pipe 101 has an inlet 103 which is closed by a disc 104 when the valve 100 is closed as in FIG. 9. A pressure-activated valve actuator is coupled to the disc 104. The valve actuator comprises a flexible diaphragm 105 which carries a shaft 106. A sealed valve chamber 107 contains a mass of gas which is trapped between the diaphragm 105 and a wall 109. When the fuel tank is empty, or the level 110 of liquid fuel drops below a certain level, then a helical spring 111 acting between the wall 109 and the diaphragm 105 pushes the diaphragm up to a raised (open) position shown in FIG. 8. This lifts the disc 104 up from the inlet 103 and enables fuel to flow into the pipe inlet 103 and out of the valve pipe as indicated by arrow 112. The wall of a valve inlet chamber 113 above the pipe inlet 103 is formed from a gauze or other structure with openings which permit fuel to flow into the valve inlet chamber 113 as indicated by arrows 114 when the valve is open.

As the tank is filled and the level of fuel increases, the weight of liquid fuel in the outboard compartment 11 above the diaphragm 105 applies a pressure P1 (and an associated force F1) to the upper side of the diaphragm 105. The trapped mass of gas in the chamber 107 applies a pressure P2 (and an associated force F2) to the lower side of the diaphragm 105 which opposes the pressure P1. Initially P1>P2 so there is a resultant force F1–F2 which pushes the diaphragm 105 down to its lowered (closed) position shown in FIG. 9, compressing the spring 111 and the trapped gas in the valve chamber 107, and causing the disc 104 to close the inlet 103 of the valve pipe 101 and prevent liquid fuel from flowing out of the fuel tank through the pipe.

Once the valve is closed and the disc 104 is contacting the valve pipe 101 then the diaphragm 105 cannot move down any further—so the pressure of the mass of trapped gas becomes less than the pressure in the liquid on the other side of the diaphragm (that pressure being the sum of the ullage pressure and the pressure created by the weight of fuel). Even though the ullage pressure will decrease as the aircraft ascends, it will not cause the mass of trapped gas to expand and open the valve unintentionally.

When the level of the liquid fuel drops, there is a consequential reduction in the pressure P1 created by the head of liquid fuel. Once the pressure has dropped sufficiently this generates a pressure difference P2–P1 across the diaphragm 105 which causes the diaphragm 105 to move up and the disc 104 to lift to its raised (open) position (FIG. 8) in which it permits the liquid fuel to flow out of the fuel tank through the pipe. The spring 111 is in compression in FIG. 9, and urges the diaphragm 105 to move up to its open position (FIG. 8) when the liquid level in the outboard fuel compartment 11 has dropped below a pre-set level—for instance the level of the isolation valve 21. FIG. 8 shows the spring 111 in its relaxed state—i.e. it is not in tension or in compression so it is not applying any force. As the diaphragm 105 moves up then the trapped gas expands and the pressure P2 in the chamber 107 reduces until the various forces are in equilibrium.

In summary, the valve 100 is positioned so that a weight of liquid fuel in the outboard fuel tank compartment 11 above the diaphragm 105 applies an activation force to the upper face of the diaphragm, and the gas trapped in the valve chamber 107 applies an opposing force to the lower face of the diaphragm. The valve actuator (diaphragm 105) is arranged so that a weight of liquid fuel in the outboard fuel tank compartment 11 applies a pressure to the valve actuator which causes the valve actuator to move to a first (closed) position which in turn causes the valve to close (FIG. 9) and prevent liquid fuel from flowing out of the fuel tank compartment through the valve. The valve actuator 105 is also arranged to move to a second (open) position (FIG. 8) in response to a level of the liquid fuel in the outboard fuel tank compartment 11 dropping and an associated reduction in the pressure applied to the valve actuator. The movement of the valve actuator 105 to the second (open) position causes the valve to open and permit liquid fuel to flow out of the outboard fuel tank compartment through the valve.

Rotor burst protection is required to avoid fuel transferring from the inboard compartment to the outboard compartment in the event that the outboard compartment is punctured. Therefore in any of the embodiments described above a one way valve may be included in addition to the float or pressure-activated valve 60, 100 to prevent fuel from flowing from the inboard compartment into the outboard compartment via the valve 60, 100.

Although the invention has been described above with reference to one or more preferred embodiments, it will be appreciated that various changes or modifications may be made without departing from the scope of the invention as defined in the appended claims.

The invention claimed is:

1. An aircraft fuel tank system comprising:
a first fuel tank compartment configured to contain liquid fuel;
a residual fuel conduit including an inlet in the fuel tank compartment and an outlet external to the first fuel tank compartment, wherein the residual fuel conduit is angled in a downward direction from the inlet to the outlet such that the inlet is above the outlet;
a float-activated valve at the inlet to the residual fuel conduit in the first fuel tank compartment, wherein the float-activated valve comprises a float arranged to become positively buoyant when immersed in liquid fuel in the first fuel tank compartment so that the float moves up to a raised position which causes the valve to close and prevent liquid fuel from flowing out of the first fuel tank compartment, through the valve and through the residual fuel conduit;
the float is arranged to move down to a lowered position in response to a level of the liquid fuel in the first fuel tank compartment dropping, the movement of the float to the lowered position causing the valve to open and permit liquid fuel to flow through the residual fuel conduit and out of the first fuel tank compartment through the valve, and
a transfer pipe connecting the first fuel tank compartment to a second fuel tank compartment and permitting liquid fuel to flow between the first and second fuel tank compartments, wherein the float-activated valve is positioned so that, when the level of the liquid fuel in the first fuel tank compartment drops below the transfer pipe, fuel can still flow out of the first fuel tank compartment.

2. The aircraft fuel tank system of claim 1, wherein the valve further comprises:
a crank arm arranged to rotate on a pivot; the float is carried by the crank arm on a first side of the pivot; a valve member is carried by the crank arm on a second side of the pivot; and the valve member is arranged to rotate on the crank arm and close the valve by blocking a flow path through the valve when the float rotates up on the crank arm to the raised position.

3. The system of claim 1 further comprising a pump for pumping liquid fuel out of the first fuel tank compartment.

4. The system of claim 1 wherein the first fuel tank compartment comprises a bottom wall, a rib which is joined to the bottom wall, and a gap between the rib and the bottom wall; wherein the valve permits liquid fuel to flow out of the first fuel tank compartment through the gap.

5. The system of claim 1 wherein the valve permits liquid fuel to flow out of the first fuel tank compartment through the valve into the second fuel tank compartment.

6. The system of claim 5, further comprising an isolation valve configured to be closed to prevent liquid fuel from flowing between the first and second fuel tank compartments through the transfer pipe.

7. The system of claim 5 further comprising a pump for pumping liquid fuel out of the second fuel tank compartment.

8. The system of claim 5 wherein the first fuel tank compartment comprises a bottom wall, a rib which is joined to the bottom wall, and a seal member which seals a gap between the rib and the bottom wall; and wherein the valve and residual fuel conduit are carried by the seal member and wherein the residual fuel conduit, while the valve is open, permits liquid fuel to flow out of the first fuel tank compartment through the gap and into the second fuel tank compartment.

9. The system of claim 8 wherein the residual fuel conduit is a valve pipe which is carried by the seal member.

10. An aircraft comprising an aircraft fuel tank system according to claim 1.

11. The aircraft of claim 10, wherein the aircraft fuel tank system is installed in a wing of the aircraft.

12. The aircraft fuel tank system of claim 1 wherein the outlet to the residual fuel conduit is at an outer wall of the first fuel tank compartment.

13. An aircraft fuel tank system comprising:
a fuel tank compartment configured to contain liquid fuel; and
a float-activated valve comprising a float arranged to become positively buoyant when immersed in liquid fuel so that the float moves up to a raised position which causes the float-activated valve to close and prevent liquid fuel from flowing out of the fuel tank compartment through the valve, and
the float is arranged to move down to a lowered position in response to a level of the liquid fuel in the fuel tank compartment dropping, the movement of the float to the lowered position causes the valve to open and permit liquid fuel to flow out of the fuel tank compartment through the valve, wherein the float is located within the fuel tank compartment in both the raised position and the lowered position,
a residual fuel conduit including an inlet in the fuel tank compartment and an outlet external to the first fuel tank compartment, and
a fuel transfer conduit having an inlet in the fuel tank compartment and an outlet in another fuel tank compartment, wherein the float activated valve and the inlet to the residual fuel conduit are both below the fuel transfer conduit.

14. A method of operating a valve in an aircraft fuel tank compartment, the method comprising:
moving a valve actuator in response to changes in an amount of liquid fuel in the fuel tank compartment;
closing the valve in response to the valve actuator moving upward in the fuel tank compartment, and
opening the valve in response to the valve actuator moving down in the fuel tank compartment;
wherein the opening of the valve causes the liquid fuel to flow into an inlet of a residual fuel conduit, through the residual fuel conduit, and out an outlet of the residual fuel conduit which allows the liquid fuel to flow out of the fuel tank compartment,
wherein the closure of the valve prevents the liquid fuel from flowing into the residual fuel conduit and out of the fuel tank compartment, and the opening of the valve allows the liquid fuel to flow through the residual fuel conduit and out of the fuel tank compartment, and
wherein the residual fuel conduit is downwardly angled from the inlet of the residual fuel conduit to the outlet of the residual fuel conduit such that the outlet is below the inlet.

15. The method of claim 14 wherein the valve actuator is a float which is positively buoyant with respect to the liquid fuel.

16. The method of claim 14 further comprising a fuel transfer conduit having an inlet in the fuel tank compartment and an outlet in another fuel tank compartment, wherein the float activated valve and the inlet to the residual fuel conduit are both below the fuel transfer conduit.

* * * * *